DECOUPLED FILTRATION TRANSFORMER CONVERTER SYSTEM

Filed March 27, 1953

INVENTOR.
HAROLD J. BROWN
BY
Strodling and Krost attys.

United States Patent Office 2,710,374

Patented June 7, 1955

2,710,374

DECOUPLED FILTRATION TRANSFORMER CONVERTER SYSTEM

Harold J. Brown, Indianapolis, Ind.

Application March 27, 1953, Serial No. 364,391

5 Claims. (Cl. 321—2)

My invention relates in general to vibrator converter systems, and in particular to circuit arrangements to prevent the usual contact point damage which is associated with the making and breaking of electrical circuits.

In the design of vibrator converters, lowering of the circuit inductances to facilitate the breaking of the circuit will, due to the nature of contact closure, result in increased damage at the contact-make due to the high currents necessarily flowing to recharge the capacitor.

In my application Serial No. 252,759, now Patent No. 2,633,560, issued March 31, 1953, I disclosed a vibrator converter circuit employing a filtration transformer in series with a power transformer, one of the objects of which was to reduce the destructive effect due to buffer capacitor while at the same time reducing the destructive effect due to leakage inductance, thus allowing the deliverance of more power.

In my application Serial No. 333,912, I disclosed a vibrator converter circuit employing a decoupling transformer system, one of the objects of which was improved reliability and increased power deliverance together with longer life.

The first object of this present application therefore is to combine the principle of operation disclosed in my application Serial No. 252,759 with the principle of operation as disclosed in my application Serial No. 333,912.

A more specific object is the replacement of the filtration transformer as disclosed in application Serial No. 252,759 with a decoupling transformer and associated divided buffer capacitors and resistor as disclosed in my application Serial No. 333,912, thereby developing increased power over that provided by either of the systems disclosed in the above identified applications.

Another object of this invention is to allow the system described in application Serial No. 252,759 to use zero to positive residual current, thus establishing voltage reversal which minimizes the effect of residual capacity in the filtration transformer.

Another object is to provide a non-destructive commutating path across the input to the vibrator system so that more effective damping of the residual energy in the filtration transformer may be provided.

Another object is to increase the power handling capacity of a converter system as described in my application Serial No. 333,912 by the substitution of the smaller distributed capacity and inductance of the filtration transformer as the limiting factor in power handling capability.

Another object is to increase the power handling capacity of a converter system as described in application Serial No. 333,912 by the substitution of inherently smaller buffer capacitors in a two-transformer combination over those necessary to provide the excitation in a single transformer.

Other objects and a fuller understanding of the invention may be had by referring to the following description and claims, taken in conjunction with the accompanying drawing, in which:

Figures 1, 2, 3:
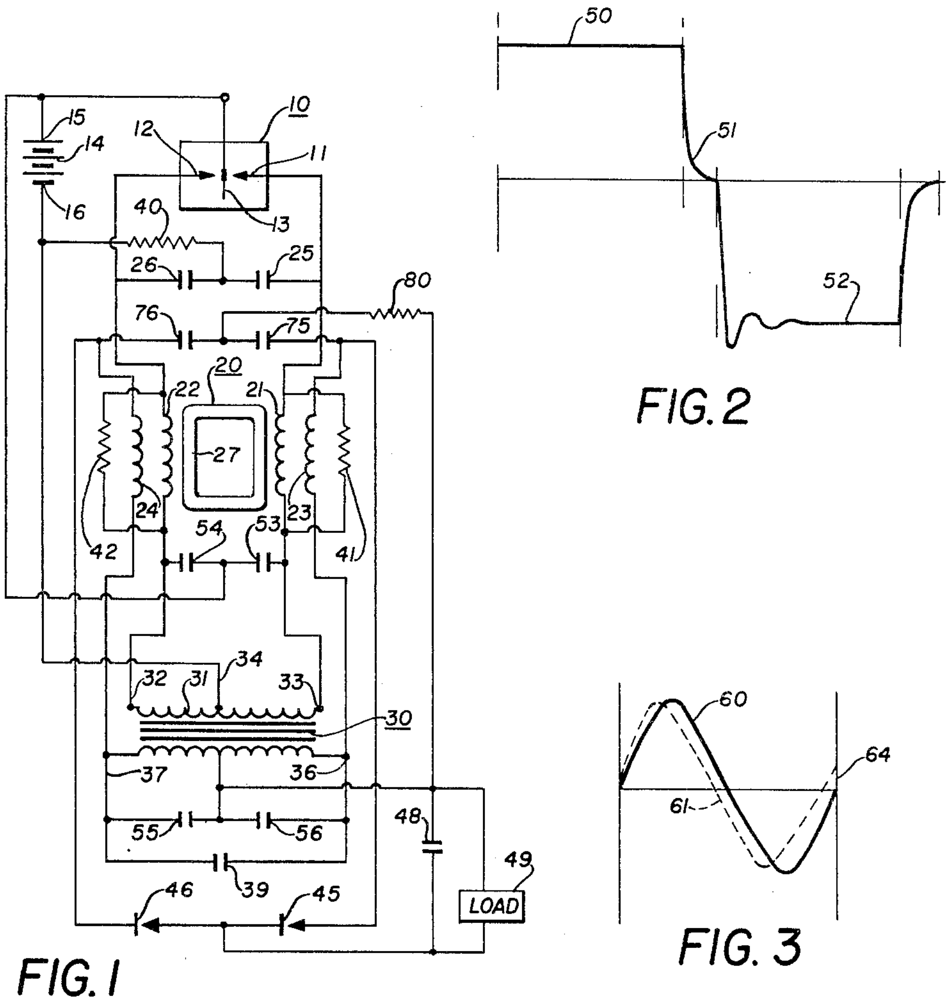
Figure 1 is a diagrammatic illustration of a converter circuit embodying the features of my invention.
Figure 2 shows the voltage across one-half of the input transformer during a full vibrator cycle.
Figure 3 shows the exciting current relationship in the system.

With reference to Figure 1, the invention comprises, generally, a vibrator 10, a decoupling input transformer 20, a power transformer 30, buffer capacitors 25 and 26, rectifiers 45 and 46 adapted to supply power to a load 49.

The vibrator may be of any suitable design and comprises, generally, two opposed contacts 11 and 12, and a vibrating contact 12 disposed therebetween which is connected to a terminal 15 of a direct current source 14. The decoupling input transformer 20 has a magnetic core 27, and two primary windings 21 and 22, and two secondary windings 23 and 24.

Power transformer 30 has a primary winding 31 with end terminals 32 and 33, with intermediate terminal 34 connected to terminal 16 of the power source 14. Secondary winding 35 of the power transformer 30 has end terminals 36 and 37, and intermediate terminal 38. Capacitor 39 is connected in shunt relationship to transformer 30 to provide the proper net excitation for the system as a power factor correction device made possible by the connection of transformer 20 connected in a series relationship between interrupter 10 and transformer 30. Buffer capacitors 25 and 26 are in shunt relationship to the vibrator 10 and decoupling transformer 20, and are used to commutate the residual magnetizing current in the system. Decoupling resistor 40 is used as a current path to provide for leakage flux between windings 21 and 22 of transformer 20 at moment of contact break. Resistors 41 and 42 are in shunt relationship to transformer 20, and absorb the residual energy in the transformer.

Capacitors 53 and 54 are in shunt relationship to transformer 30 and have their center tap preferably connected to vibrator contact 13 and are used to eliminate any inductance effects due to imperfect coupling in transformer 30 or in power source 14. Capacitors 55 and 56 are in shunt relationship to transformer 30 to cancel inductive effects due to imperfect coupling in the secondary of transformer 30. Capacitor 48 maintains constant voltage across load 49 during the switching interval.

With reference to Figure 2, voltage 50 is developed between either terminal 11 or 12 of the vibrator and central terminal 34 of transformer 30 when the respective contact is engaged to contact 13 and the opposite side of the power source 14. The voltage 50 is the voltage of the power source 14.

Voltage 51 is the swingback in the off-contact interval and will return to zero by virtue of the interaction of resistors 41 and 42 of Figure 1 with the positive residual current 64 of Figure 3. Voltage 52 is the voltage on the open side when one contact is closed and shows the effect of the comparatively high leakage inductance between windings 21 and 22 of transformer 20.

With reference to Figure 3, the exciting current 60 is supplied by the source 14 during the vibrator contact interval. Curve 61 represents a deviation from curve 60 by virtue of practical variations in the system. This current results from a correct combination of inductance in transformers 20 and 30 with capacitor 39. Transformers 20 and 30 have substantially the same turns ratio between primary and secondary to eliminate the effect of load currents upon the excitation. It will be noticed that the positive current value 64 at the moment of vibrator contact is comparatively small in comparison with the amount necessary to excite a single transformer and thus may be commutated by comparatively small capacitors 25 and 26 and resistor 40.

Figure 4:
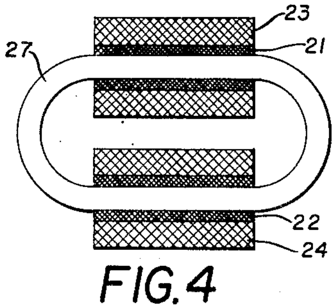
Figure 4 shows a representative construction of the decoupling transformer.

The decoupling transformer is substantially the same as disclosed in my application Serial No. 333,912 and briefly the primary winding 21 and the secondary winding 23 constitute a pair of half-windings, and the primary winding 22 and the secondary winding 24 constitute an opposite pair of half-windings. As shown in Figures 1 and 4, the pair of primary winding 21 and secondary winding 23 are closely coupled with respect to each other as being concentrically mounted with each other over a common core portion. Similarly, the pair of primary winding 22 and secondary winding 24 are closely coupled with respect to each other as being concentrically mounted over another common core portion of the magnetic circuit. The half-windings of each pair are closely coupled with respect to each other, but the pairs as a unit are loosely coupled with respect to each other. During one-half of the cycle, the pair comprising the primary winding 21 and secondary winding 23 may be characterized as conducting primary and secondary half-windings, while the other pair comprising the primary winding 22 and secondary winding 24 may be characterized as non-conducting primary and secondary half-windings.

In the prior vibrator art, it has been the practice to couple transformer windings around the center taps rather than with each other. Thus, in the prior art devices, a reduction in leakage inductance between primary and secondary windings necessary to increase current handling rating or to improve life characteristics, automatically resulted in an increased current surge associated with recharge of the buffer capacitor. This placed a practical limit on the power output as well as reduced the reliability of the vibrator converter.

With my invention, reduction in the leakage inductance between the conducting primary and secondary winding-halves may be carried as far as is desired since the buffer current surge is limited by resistor 40 and the comparatively large leakage inductance between the primary windings 21 and 22 of transformer 20.

In the prior vibrator art, resistances have been incorporated in series with the buffer capacitor for the purpose of limiting the current surge. However, it can be shown that the resistance for sufficient surge suppression will have many adverse effects tending, in general, to impair the buffer function itself. In my present invention, the surge limiting resistor 40 reacts only upon the leakage airborne flux between opposite pairs, which is in turn small compared to the mutual flux flowing through the entire core. Thus, in my present invention, the full buffer function of capacitors 25 and 26 is retained.

By virtue of the advantages conveyed by my present decoupled filtration transformer circuit, there is a considerable increase in output over that obtainable by a single decoupling transformer system.

In a single decoupling transformer system, power limitations will occur as the leakage inductance and the distributed capacity becomes effective with increased size or energy density. The ratio of the closely coupled leakage inductance to the distributed capacity must be kept within limits if desired performance parameters are to be met.

When a decoupled filtration transformer circuit of my present application is substituted for a single decoupling transformer, there will be a reduction of one-third in the leakage inductance and distributed capacity for optimum coil geometry. This will result in a corresponding increase in power capability of about square root of 3.

Another limitation in a single decoupling transformer system is the increase in the absolute value of the buffer capacity. As the decoupled filtration transformer circuit of my present application furnishes in the main its own excitation, the equivalent input elements of my two-transformer system are of higher impedance, thus reducing the input buffer surge to the allowable values.

By virtue of the advantage conveyed by the decoupled filtration transformer circuit, together with the change in the mode of timing, an increase in output and quality of performance of a two-transformer circuit is made possible.

With the two-transformer circuit, as described in application Serial No. 252,759, the voltage swingback tends to be zero by virtue of the negative exciting current, while in the present decoupled filtration transformer combination, the swingback tends to be 50 percent. Stray capacity effects are reduced by one-half by physical decoupling and by one-quarter by swingback improvement. Thus, a coil geometry having lower leakage inductance may be used. Idling capabilities at light load are thus improved, an important consideration in two-way radio usage.

The presence of the commutating path across the input to the decoupled filtration transformer circuit allows heavier damping of the filtration transformer, while taking care of certain vibrator aberrations such as make-bounce. The running and starting stability of the decoupled filtration transformer circuit systems is also improved by virtue of this consideration.

In Figure 1, capacitors 25 and 26 and resistor 40 are in shunt relationship to the primary circuit, and the power source, while capacitors 75 and 76 and resistor 80 are in shunt relationship to the secondary circuit and the load circuit. Choice in the use of these capacitor arrangements is dictated by economic considerations only by virtue of the close coupling between corresponding primary and secondary windings of the decoupling transformer, which makes it equally expedient to supply excitation at either voltage level.

Resistor 40 or resistor 80, which are respectively connected to the midpoints of the two sets of capacitors, are connected to neutral points with reference to the alternating current system.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

I claim as my invention:

1. A converter circuit energized from a direct current source and disposed between interrupter means and output rectifying means, said interrupter means having first and second opposed contacts and a vibrating contact disposed therebetween connected to one side of the direct current source and said rectifying means having first and second input terminals and output terminal means, said converter circuit comprising a first transformer having a first and second primary winding means and having a first and second secondary winding means, a magnetic core having first and second core portions for said first transformer, said first primary winding means and said first secondary winding means being mounted on said first core portion and said second primary winding means and said second secondary winding means being mounted on said second core portion, a second transformer having primary winding means and secondary winding means, said primary winding means of the second transformer having first and second end terminals and an intermediate terminal therebetween, said secondary winding means of the second transformer having first and second end terminals and an intermediate terminal therebetween, first circuit means connecting the first primary winding means of the first transformer between the first contact of the interrupter means and the first end terminal of the primary winding means of the second transformer, second circuit means for connecting the second primary winding means of the first transformer between the second contact of the interrupter means and the second end terminal of the primary winding means of the second transformer, first connection means for connecting the first secondary winding means of the first transformer between the first end terminal of the secondary winding means of the second transformer and the first input terminal of the rectifying means, second connection means for connecting the second secondary winding means of the first transformer between second end terminal of the secondary winding means of the second transformer to the second input terminal of the rectifying means, third connection means for connecting the intermediate terminal of the primary winding means of the second transformer to the other side of the direct current source, a load circuit connected between the intermediate terminal of the secondary winding means of the second transformer to the output terminal means of the rectifying means, and capacitor means connected in shunt relationship with winding means on the first transformer, said capacitor means comprising two portions connected in series and having an intermediate capacitor terminal, and resistor means connected between the said intermediate capacitor terminal and a neutral point of the alternating current system.

2. A converter circuit energized from a direct current source and disposed between interrupter means and output rectifying means, said interrupter means having first and second opposed contacts and a vibrating contact disposed therebetween connected to one side of the direct current source and said rectifying means having first and second input terminals and output terminal means, said converter circuit comprising a first transformer having a first and second primary winding means and having a first and second secondary winding means, a magnetic core having first and second core portions for said first transformer, said first primary winding means and said first secondary winding means being mounted on said first core portion and said second primary winding means and said second secondary winding means being mounted on said second core portion, a second transformer having primary winding means and secondary winding means, said primary winding means of the second transformer having first and second end terminals and an intermediate terminal therebetween, said secondary winding means of the second transformer having first and second end terminals and an intermediate terminal therebetween, first circuit means connecting the first primary winding means of the first transformer between the first contact of the interrupter means and the first end terminal of the primary winding means of the second transformer, second circuit means for connecting the second primary winding means of the first transformer between the second contact of the interrupter means and the second end terminal of the primary winding means of the second transformer, first connection means for connecting the first secondary winding means of the first transformer between the first end terminal of the secondary winding means of the second transformer and the first input terminal of the rectifying means, second connection means for connecting the second secondary winding means of the first transformer between the second end terminal of the secondary winding means of the second transformer to the second input terminal of the rectifying means, third connection means for connecting the intermediate terminal of the primary winding means of the second transformer to the other side of the direct current source, a load circuit connected between the intermediate terminal of the secondary winding means of the second transformer to the output terminal means of the rectifying means, and capacitor means connected in shunt relationship with primary winding means on the first transformer, said capacitor means comprising two portions connected in series and having an intermediate capacitor terminal, and resistor means connected between the said intermediate capacitor terminal and the direct current source.

3. A converter circuit energized from a direct current source and disposed between interrupter means and output rectifying means, said interrupter means having first and second opposed contacts and a vibrating contact disposed therebetween connected to one side of the direct current source and said rectifying means having first and second input terminals and output terminal means, said converter circuit comprising a first transformer having a first and second primary winding means and having a first and second secondary winding means, a magnetic core having first and second core portions for said first transformer, said first primary winding means and said first secondary winding means being mounted on said first core portion and said second primary winding means and said second secondary winding means being mounted on said second core portion, a second transformer having primary winding means and secondary winding means, said primary winding means of the second transformer having first and second end terminals and an intermediate terminal therebetween, said secondary winding means of the second transformer having first and second end terminals and an intermediate terminal therebetween, first circuit means connecting the first primary winding means of the first transformer between the first contact of the interrupter means and the first end terminal of the primary winding means of the second transformer, second circuit means for connecting the second primary winding means of the first transformer between the second contact of the interrupter means and the second end terminal of the primary winding means of the second transformer, first connection means for connecting the first secondary winding means of the first transformer between the first end terminal of the secondary winding means of the second transformer and the first input terminal of the rectifying means, second connection means for connecting the second secondary winding means of the first transformer between the second end terminal of the secondary winding means of the second transformer to the second input terminal of the rectifying means, third connection means for connecting the intermediate terminal of the primary winding means of the second transformer to the other side of the direct current source, a load circuit connected between the intermediate terminal of the secondary winding means of the second transformer to the output terminal means of the rectifying means, and capacitor means connected in shunt relationship with secondary winding means on the first transformer, said capacitor means comprising two portions connected in series and having an intermediate capacitor terminal, and resistor means connected between the said intermediate capacitor terminal and the load circuit.

4. A converter circuit energized from a direct current source and disposed between interrupter means and output rectifying means, said interrupter means having first and second opposed contacts and a vibrating contact disposed therebetween connected to one side of the direct current source and said rectifying means having first and second input terminals and output terminal means, said converter circuit comprising a first transformer having a first and second primary winding means and having a first and second secondary winding means, a magnetic core having first and second core portions for said first transformer, said first primary winding means and said first secondary winding means being mounted on said first core portion and said second primary winding means and said second secondary winding means being mounted on said second core portion, a second transformer having primary winding means and secondary winding means, said primary winding means of the second transformer having first and second end terminals and an intermediate terminal therebetween, said secondary winding means of the second transformer having first and second end terminals and an intermediate terminal therebetween, first circuit means connecting the first primary winding means of the first transformer between the first contact of the interrupter means and the first end terminal of the primary winding means of the second transformer, second circuit means for connecting the second primary winding means of the first transformer between the second contact of the interrupter means and the second end terminal of the primary winding means of the second transformer, first connection means for connecting the first secondary winding means of the first transformer between the first end terminal of the secondary winding means of the second transformer and the first input terminal of the rectifying means, second connection means for connecting the second secondary winding means of the first transformer between the second end terminal of the secondary winding means of the second transformer to the second input terminal of the rectifying means, third connection means for connecting the intermediate terminal of the primary winding means of the second transformer to the other side of the direct current source, a load circuit connected between the intermediate terminal of the secondary winding means of the second transformer to the output terminal means of the rectifying means, and capacitor means connected in shunt relationship with winding means on the first transformer, said capacitor means comprising two portions connected in series and having an intermediate capacitor terminal, resistor means connected between the said intermediate capacitor terminal and a neutral point of the alternating current system, and capacity means connected in shunt relationship with winding means on the second transformer.

5. A converter circuit energized from a direct current source and disposed between interrupter means and output rectifying means, said interrupter means having first and second opposed contacts and a vibrating contact disposed therebetween connected to one side of the direct current source and said rectifying means having first and second input terminals and output terminal means, said converter circuit comprising a first transformer having a first and second primary winding means and having a first and second secondary winding means, a magnetic core having first and second core portions for said first transformer, said first primary winding means and said first secondary winding means being mounted on said first core portion and said second primary winding means and said second secondary winding means being mounted on said second core portion, a second transformer having primary winding means and secondary winding means, said primary winding means of the second transformer having first and second end terminals and an intermediate terminal therebetween, said secondary winding means of the second transformer having first and second end terminals and an intermediate terminal therebetween, first circuit means connecting the first primary winding means of the first transformer between the first contact of the interrupter means and the first end terminal of the primary winding means of the second transformer, second circuit means for connecting the second primary winding means of the first transformer between the second contact of the interrupter means and the second end terminal of the primary winding means of the second transformer, first connection means for connecting the first secondary winding means of the first transformer between the first end terminal of the secondary winding means of the second transformer and the first input terminal of the rectifying means, second connection means for connecting the second secondary winding means of the first transformer between the second end terminal of the secondary winding means of the second transformer to the second input terminal of the rectifying means, third connection means for connecting the intermediate terminal of the primary winding means of the second transformer to the other side of the direct current source, a load circuit connected between the intermediate terminal of the secondary winding means of the second transformer to the output terminal means of the rectifying means, and capacitor means connected in shunt relationship with winding means on the first transformer, said capacitor means comprising two portions connected in series and having an intermediate capacitor terminal, resistor means connected between the said intermediate capacitor terminal and a neutral point of the alternating current system, and capacity means in circuit relationship with said second transformer for exciting the second transformer with current for generating in said second transformer a voltage opposing the voltage supplied by the interrupting means to minimize the exciting current flow through the filtration transformer to a low or positive value at the instant of interruption of the interrupting means.

References Cited in the file of this patent

UNITED STATES PATENTS

| | | |
|---|---|---|
| 2,231,873 | Barrett | Feb. 18, 1941 |
| 2,345,087 | Beer et al. | Mar. 28, 1944 |
| 2,633,560 | Brown | Mar. 31, 1953 |